(12) United States Patent
Köffers et al.

(10) Patent No.: US 12,415,324 B2
(45) Date of Patent: Sep. 16, 2025

(54) METHOD FOR MANUFACTURING MOULDED PARTS FROM FIBRE COMPOSITE MATERIAL

(71) Applicant: Siempelkamp Maschinen- und Anlagenbau GmbH, Krefeld (DE)

(72) Inventors: Fabian Köffers, Krefeld (DE); Michael Schöler, Rheurdt (DE); Klaus Schürmann, Juchen (DE); Lothar Sebastian, Duisburg (DE)

(73) Assignee: Siempelkamp Maschinen- und Anlagenbau GmbH, Krefeld (DE)

( * ) Notice: Subject to any disclaimer, the term of this patent is extended or adjusted under 35 U.S.C. 154(b) by 247 days.

(21) Appl. No.: 17/636,956

(22) PCT Filed: Jul. 28, 2020

(86) PCT No.: PCT/EP2020/071238
§ 371 (c)(1),
(2) Date: Feb. 21, 2022

(87) PCT Pub. No.: WO2021/032415
PCT Pub. Date: Feb. 25, 2021

(65) Prior Publication Data
US 2022/0355554 A1 Nov. 10, 2022

(30) Foreign Application Priority Data
Aug. 22, 2019 (DE) ............ 10 2019 005 911.5

(51) Int. Cl.
*B29C 70/44* (2006.01)
*B29C 70/54* (2006.01)

(52) U.S. Cl.
CPC ............ *B29C 70/44* (2013.01); *B29C 70/54* (2013.01); *B29K 2995/0097* (2013.01)

(58) Field of Classification Search
CPC ....... B29C 70/44; B29C 70/54; B29C 70/544; B29C 43/12; B29C 43/3642;
(Continued)

(56) References Cited

U.S. PATENT DOCUMENTS 5,102,604 A * 4/1992 Sidles .................. B29C 43/10
425/405.2
8,765,048 B2 7/2014 Ruiz et al.
(Continued)

FOREIGN PATENT DOCUMENTS

CN 1842411 A 10/2006
CN 108349174 A 7/2018
(Continued)

*Primary Examiner* — Andrew L Swanson
(74) *Attorney, Agent, or Firm* — The Webb Law Firm

(57) ABSTRACT

The invention relates to a method for producing molded parts from fiber composite material, including the following steps: a) providing a press having a first press tool, a second press tool and a membrane. The first press tool and the second press tool are movable relative to each other. The membrane is connected to one of the press tools, a cavity for a working medium being formed between the membrane and the press tool connected thereto, a working chamber for a workpiece being formed in the other press tool, and the volume of the working chamber being modifiable by a movement of the membrane when the press is closed, b) providing at least one workpiece having a workpiece volume. The workpiece has a matrix and fibers inserted therein, c) inserting the workpiece into the working chamber of the press, d) closing the press. The working chamber takes up a first volume, e) applying pressure and/or temperature to the workpiece by means of the membrane. The working chamber takes up a second volume, a hardened molded part being created from the workpiece, and f) opening the press and removing the molded part. In order to ensure continuous and uniform pressure distribution, according to the invention the (Continued)

first volume of the working chamber is smaller than the workpiece volume, and therefore the workpiece is already compressed at step d) and before step e).

11 Claims, 7 Drawing Sheets

(58) Field of Classification Search
CPC .......... B29C 43/361; B29C 2043/3649; B29C 70/46; B29C 2043/3647; B29C 2043/3652
See application file for complete search history.

(56) References Cited

U.S. PATENT DOCUMENTS

| | | |
|---|---|---|
| 10,576,700 B2 | 3/2020 | Namaizawa et al. |
| 2004/0241273 A1* | 12/2004 | Hermann .............. B29C 43/361 425/389 |
| 2008/0078876 A1 | 4/2008 | Baggette et al. |
| 2016/0067930 A1 | 3/2016 | Fastert et al. |
| 2018/0281319 A1 | 10/2018 | Sebastian et al. |
| 2021/0001517 A1* | 1/2021 | Ichino .................... B29C 70/46 |

FOREIGN PATENT DOCUMENTS

| | | |
|---|---|---|
| CN | 108466434 A | 8/2018 |
| DE | 10006359 C1 | 10/2001 |
| DE | 102016210090 A1 | 12/2017 |
| JP | 201894834 A | 6/2018 |
| WO | 02102565 A1 | 12/2002 |

* cited by examiner

METHOD FOR MANUFACTURING MOULDED PARTS FROM FIBRE COMPOSITE MATERIAL

CROSS-REFERENCE TO RELATED APPLICATIONS

This application is the United States national phase of International Application No. PCT/EP2020/071238 filed Jul. 28, 2020, and claims priority to German Patent Application No. 10 2019 005 911.5 filed Aug. 22, 2019, the disclosures of which are hereby incorporated by reference in their entirety.

BACKGROUND OF THE INVENTION

Field of the Invention

The invention relates to a method for manufacturing moulded parts from fibre composite material, comprising the following steps: a) providing a press with a first pressing tool, a second pressing tool and a membrane, wherein the first pressing tool and the second pressing tool can be moved relative to one another, wherein the membrane is connected to one of the pressing tools, wherein a cavity for a working medium is formed between the membrane and the pressing tool connected to it, wherein a working space for a workpiece is formed in the other pressing tool, and wherein the volume of the working space can be changed when the press is closed by moving the membrane, b) providing at least one workpiece with a workpiece volume, wherein the workpiece has a matrix and fibres inserted therein, c) inserting the workpiece into the working space of the press, d) closing the press, wherein the working space occupies a first volume, e) applying pressure and/or temperature to the workpiece using the membrane, wherein the working space occupies a second volume, and wherein a hardened moulded part is formed from the workpiece, and f) opening the press and removing the moulded part.

Description of Related Art

Fibre composite materials are composite materials that consist substantially of two main components: reinforcing fibres and a plastic in which the fibres are embedded ("matrix" or "resin"). By combining the two main components, it can be achieved that the composite material as a whole has better properties than the two components alone. For example, due to their high tensile strength in the direction of the fibre, the fibres help to increase the tensile strength of the composite material. The matrix, on the other hand, ensures, for example, that the fibres are held in their position and are protected from mechanical and chemical influences.

One of several options for the manufacture of components from fibre composite materials is based on the use of prefabricated fibre-resin semi-finished products (so-called "prepregs", abbreviation of "preimpregnated fibres"). In the case of such semi-finished products, the fibres are provided with a resin system that has not yet reacted completely, so that the semi-finished products are still available in a flexible form (e.g. web-shaped, on rollers). The prepregs are only formed when the parts are manufactured and hardened at high pressure and high temperatures by completing the chemical reaction. This step can be done in a press, for example.

For example, prepregs are processed in large quantities in the aviation industry. A challenge in processing is that the aerospace industry often requires very complex part geometries, for example due to reinforcement elements such as stringers. In addition, the assembly work should be reduced, which should be achieved by using fewer, but larger parts. The combination of complex geometries and large part dimensions places increased demands on devices and processes for the manufacture of these parts. One requirement, for example, is to ensure uniform pressurisation during the manufacture of the parts.

A device and a method for manufacturing parts from fibre composite material are for example known from DE 10 2017 113 595 A1. Uniform pressurisation of the part to be manufactured should be achieved by a flexible membrane acting on the part, wherein an oil pressure acts on the membrane from the side of the membrane facing away from the part. The membrane is therefore pressed onto the part surface by an oil pressure. In this manner, it should also be ensured in the case of curved part surfaces that the oil pressure acts on all sides, i.e. hydrostatically, and thus the force acting from the membrane on the part surface is the same at all points, in particular also the force component acting orthogonally on the part surface.

The use of such a "membrane press" for manufacturing parts from fibre composite material is also known from US 2016/0297153 A1.

One challenge of using a membrane is that the part to be manufactured in the press can often only be pressurised on one side by a membrane, wherein this is usually the geometrically less complex side of the part (e.g. the smooth outer side of an aircraft fuselage) due to the limited deformability of the membrane. In contrast, the other side of the part, which is often the geometrically more complex side of the part (e.g. the inner side of an aircraft fuselage), cannot in many cases be directly pressurised by the membrane, since reinforcement elements are often provided there whose shape does not allow direct touching of the membrane due to its complex geometry. This side is therefore often inserted into a correspondingly shaped tool, wherein if necessary (e.g. for undercuts), additional cores are inserted into the tool. This arrangement means that a uniform pressure distribution on the side of the part to be manufactured facing away from the membrane can hardly be ensured. This is for example due to the fact that the tools and the cores have different thermal expansion from the workpiece and therefore exhibit different expansion behaviour in the case of rising and/or falling temperatures.

SUMMARY OF THE INVENTION

Against this background, the object underlying the invention is to ensure a uniform pressure distribution during manufacture of moulded parts from fibre composite material with a membrane press also on the side of the moulded part facing away from the membrane.

This object is achieved with a method in that the first volume of the working space is smaller than the workpiece volume, so that the workpiece is already compressed in step d) and before step e).

The method according to the invention is a method for manufacturing moulded parts from fibre composite material. The method initially comprises the step of providing a so-called "membrane press". The press comprises a first, for example upper, pressing tool, a second, for example lower, pressing tool and a membrane. The membrane can for example be formed by a thin metal sheet. The first pressing tool and the second pressing tool can be moved relative to one another so that the press can be opened and closed. The membrane is connected to one of the two pressing tools, wherein a cavity for a working medium is formed between the membrane and the pressing tool connected to it. The cavity is designed to absorb a working medium—for example a gas or a liquid. The membrane and the pressing tool connected to it are therefore connected to one another in a gas-tight and/or liquid-tight manner. When the press is closed, the volume of the working space can be changed by moving the membrane, i.e. it can be enlarged or reduced.

The method according to the invention also comprises the step of providing at least one workpiece with a workpiece volume, wherein the workpiece has a matrix and fibres inserted therein. The fibres inserted in the matrix can for example be carbon fibres, glass fibres, aramid fibres or the like. The fibres can be used, for example, as semi-finished products in the form of mats, nonwovens, fabrics, woven fabrics or knitted fabrics. The matrix or resin can for example be formed from thermoplastic plastic. The workpiece can be already finished "fibre matrix semi-finished products", which are also referred to as "prepregs".

The further steps of the method according to the invention are inserting the workpiece into the working space of the press, closing the press, wherein the working space occupies a first volume, applying pressure and/or temperature to the workpiece by means of the membrane, wherein the working space occupies a second volume, and wherein a hardened moulded part is formed from the workpiece, and opening the press and removing the moulded part. The "first volume" of the working space thus refers to the volume of the working space before the membrane acts on the workpiece, while the "second volume" of the working space refers to the volume of the working space during the action of the membrane on the workpiece. Since the membrane pressurises the workpiece and thereby reduces the working space and thus compresses the workpiece in it, the "first volume" of the working space is regularly greater than the "second volume" of the working space.

According to the invention, the first volume of the working space is smaller than the workpiece volume, so that the workpiece is already compressed in step d) and before step e). The workpiece volume refers to the volume of the workpiece before it is inserted into the working space, i.e. the volume of the workpiece in the uncompressed state. The state of the workpiece is therefore already compressed if, for example, air is pressed out between individual material layers.

In other words, the size of the workpiece and the size of the working space are matched to one another in such manner that the workpiece is a little too large for the working space or the working space is a little too small for the workpiece. The workpiece must therefore be "squeezed" into the working space. As a result, the workpiece must already be slightly compressed when it is inserted into the working space and thus already subjected to (contact-generated) prestressing when it is inserted into the working space. This approach is based on the idea that a minimum pressure should always act on the workpiece during the entire machining in the press, regardless of the pressure and temperature profile. Ensuring a minimum pressure has a significant influence on the part quality, as air inclusions in the part, for example, can be prevented by maintaining a minimum pressure. With conventional process control (without "prestressing"), there is a risk, for example, that the pressing tools "shrink" faster than the workpiece in between as a result of different thermal expansion coefficients with decreasing temperature, wherein the pressure acting on the workpiece can drop to zero. This is reliably prevented by the approach according to the invention.

According to one configuration of the method, the second volume of the working space is smaller than the workpiece volume, so that the workpiece is also compressed during step e).

As previously defined, the "second volume" of the working space is the volume of the working space during the action of the membrane on the workpiece. With the second volume of the working space also being smaller than the workpiece volume, it is ensured that the prestressing of the workpiece is maintained or, which is preferred, even increased. This should take place during step e), i.e. while pressure and/or temperature are applied to the workpiece by the membrane.

According to a further configuration of the method, in step b) at least one core with a core volume is also provided, in step c) the core is also inserted into the working space of the press and the first volume of the working space is smaller than the sum of the workpiece volume and the core volume, so that the workpiece is already compressed in step d) and before step e).

In the case of complicated part geometries, for example parts with undercuts, the use of separate cores is often necessary, as otherwise the part cannot be removed from the mould. Complex part geometries can therefore also be manufactured by using separately insertable and separately removable cores. If one or a plurality of cores is used, the previously described principle of prestressing can be achieved by the first volume of the working space being smaller than the sum of the workpiece volume and the core volume. In this way, it can be ensured that the workpiece is prestressed, although the workpiece alone (i.e. without the cores) can have a smaller volume than the working space. The additional volume of the cores ensures compression of the workpiece if it is ensured that the sum of the workpiece volume and the core volume is in any case greater than the first volume of the working space. In this way, the solution described above can also be used when using one or a plurality of cores.

For this configuration, it is further proposed that the second volume of the working space is smaller than the sum of the workpiece volume and the core volume, so that the workpiece is also compressed during step e). As previously defined, the "second volume" of the working space is the volume of the working space during the action of the membrane on the workpiece. With the second volume of the working space also being smaller than the sum of the workpiece volume and the core volume, it is ensured that the prestressing of the workpiece is maintained or, which is preferred, even increased. This should take place during step e), i.e. while pressure and/or temperature are applied to the workpiece and the cores by the membrane.

According to a further configuration of the method, the membrane is manufactured from metal and preferably has a thickness in the range between 0.05 mm and 0.5 mm, in particular between 0.15 mm and 0.3 mm.

A membrane of metal, in particular of a steel sheet, has the advantage that, on the one hand, the membrane can transmit high pressures due to the mechanical properties of metal and, on the other hand, it is well suited to heating or cooling the workpiece due to the high thermal conductivity of metal. Pressure transfer is achieved by providing a cavity next to the membrane, which can be filled by a working medium that is as incompressible as possible, for example oil, whereby the membrane deforms and is pressed in the direction of the workpiece. Heating or cooling of the workpiece can be achieved when the working medium in the cavity is heated or cooled. Preferably, the membrane has a very smooth surface, in particular a surface with an Rz value of 4.0 μm or less, preferably of 2.7 μm or less, quite preferably even below 1.0 μm, for example 0.1 μm.

According to a further configuration of the method, during step e) the pressure and/or the temperature of the working medium in the cavity is changed.

By changing the pressure and/or temperature of the working medium in the cavity, the pressure acting on the workpiece and the temperature acting on the workpiece can also be changed, since both the pressure and the temperature of the working medium are transferred to the workpiece via the membrane. Since both the pressure and the temperature can be changed, it is possible to provide changing pressure and temperature profiles instead of a constant pressure and a constant temperature, for example first an increase in pressure and temperature, then holding constant the pressure and temperature and finally a decrease in pressure and temperature. A change in the pressure of the working medium is made possible, for example by a change in the quantity of the working medium in the cavity due to inflow or outflow of working medium. A change in the temperature of the working medium, on the other hand, can be achieved, for example, by the working medium being circulated and the inflowing working medium having a higher or lower temperature than the working medium in the cavity and thus heating or cooling it.

According to a further configuration of the method, in step e), the pressure of the working medium in the cavity is increased to a maximum pressure in the range between 5 bar and 50 bar, in particular between 10 bar and 30 bar.

Alternatively or additionally to this, according to a further configuration of the method, in step e) the temperature of the working medium in the cavity can be increased to a maximum temperature in the range between 300° C. and 500° C., in particular between 330° C. and 410° C.

The above-mentioned maximum pressures and the above-mentioned maximum temperatures have led to optimal results in the manufacture of moulded parts from fibre composite material. The stated values are maximum values; during manufacture in the press, lower pressure and temperature values are also reached, for example during the warm-up phase and during the cool-down phase.

Finally, according to a further configuration of the method, in step b), a plurality of separate workpieces are provided, which are inserted into the working space of the press in step c) and are connected to one another in step e), wherein a continuous hardened moulded part is formed from the workpieces.

This method is based on the idea of using the pressure and temperature effect in the press not only to harden a single part, but also to use it to connect a plurality of parts together. The parts can for example be prepregs that harden for the first time. However, the parts can also be previously hardened parts (e.g. reinforcement elements) from fibre composite material, which become viscous again as a result of the temperature effect in order to be connected to further parts to form a common, continuous moulded part.

BRIEF DESCRIPTION OF THE DRAWINGS

The invention will be explained in more detail below with reference to a drawing which simply represents a preferred exemplary embodiment, in which is shown.

DESCRIPTION OF THE INVENTION

Figure 1A:
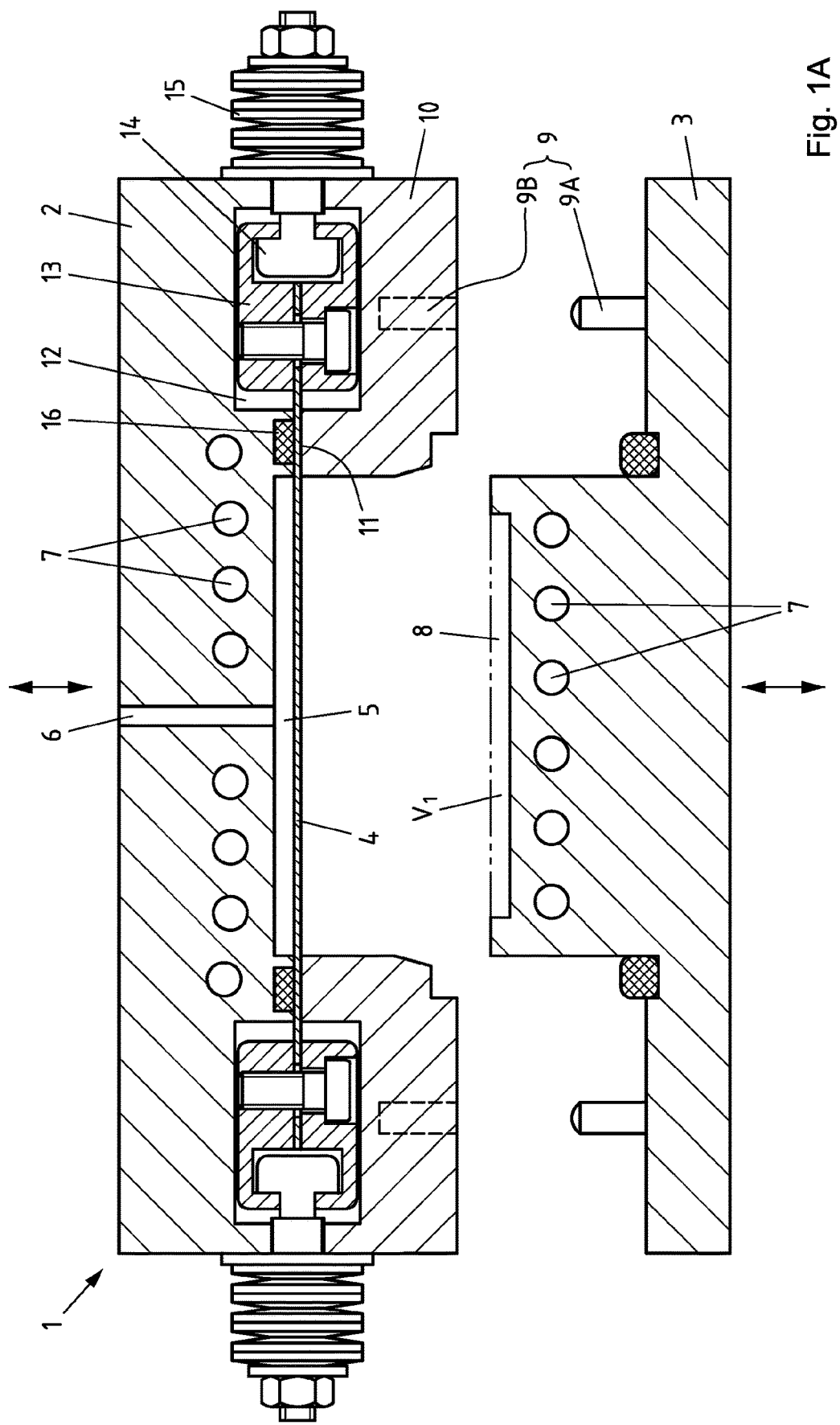
FIG. 1A: a first configuration of a press for carrying out a method according to the invention in the cross-section in the open position without an inserted workpiece.

FIG. 1A shows a first configuration of a press 1 for carrying out a method according to the invention in the cross-section in the open position without an inserted workpiece. The press 1 comprises a first, upper pressing tool 2 and a second, lower pressing tool 3. The two pressing tools 2, 3 can be moved relative to one another, for example in the vertical direction (indicated by arrows in FIG. 1). In addition, the press comprises a membrane 4 which is connected to the upper pressing tool 2. As an alternative to the configuration shown in FIG. 1, the membrane 4 could also be connected to the lower pressing tool 3. A cavity 5 is formed between the membrane 4 and the upper pressing tool 2 connected to it for a working medium, for example oil. The membrane 4 is manufactured from metal and preferably has a thickness in the range between 0.05 mm and 0.5 mm. The cavity 5 can be filled with the working medium via a channel 6. Bores 7 are provided in both the upper pressing tool 2 and the lower pressing tool 3 through which a heating and/or cooling medium can be guided.

In the configuration of the press 1 shown in FIG. 1A, a working space 8 is provided in the lower pressing tool 3 in which a workpiece (not shown in FIG. 1A) can be inserted. The working space 8 has a first volume $V_1$ when the press is open. The two pressing tools 2, 3 have a guide 9 which can for example be formed by a protrusion 9A and a recess 9B, wherein the protrusion 9A can be provided on the lower pressing tool 3 and wherein the recess 9B can be provided on the upper pressing tool 2.

The membrane 4 is connected to the upper pressing tool 2 in the following manner: The upper pressing tool 2 has a circumferential edge element 10, which is screwed to the upper pressing tool 2 (the screw connection is not represented in FIG. 1A). A gap 11 is formed between the upper pressing tool 2 and its edge element 10 through which the membrane 4 is guided. The gap 11 opens into a hollow space 12 in which a clamping device 13 is provided in which the membrane 4 is clamped. The clamping device 13 is connected to a tension anchor 14, which is led out of the upper pressing tool 2 and the edge element 10 through an opening and is pressed outwards there by a spring 15 supporting itself on the outer surface, whereby the membrane 4 is provided with prestressing. In order to seal the cavity 5, a seal 16 is provided in the gap 11, which allows movement of the membrane 4.

Figure 1B:
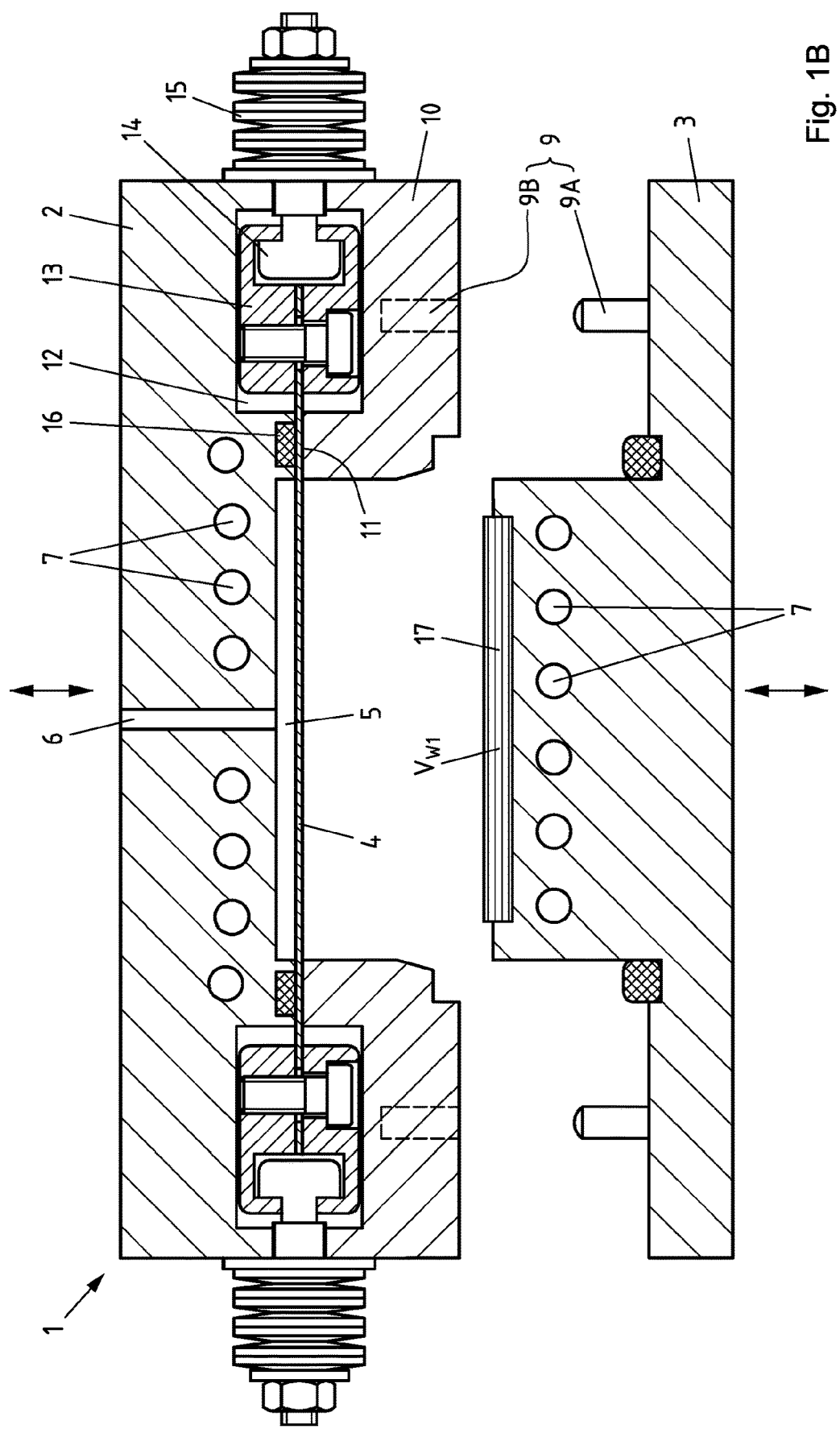
FIG. 1B: the press from FIG. 1A in open position with inserted workpiece.

FIG. 1B shows the press 1 from FIG. 1A in open position with inserted workpiece 17. The areas of the press 1 that have already been described are provided in FIG. 1B with corresponding reference numerals. The difference with the position shown in FIG. 1A is that the workpiece 17 has been inserted into the working space 8 of the lower pressing tool 3. The workpiece 17 has a workpiece volume Vw1 which is slightly larger than the first volume V1 of the working space 8. As a result, the workpiece 17 must be slightly compressed in order to be inserted into the working space 8, whereby the workpiece 17 is exposed to a prestressing.

Figure 1C:
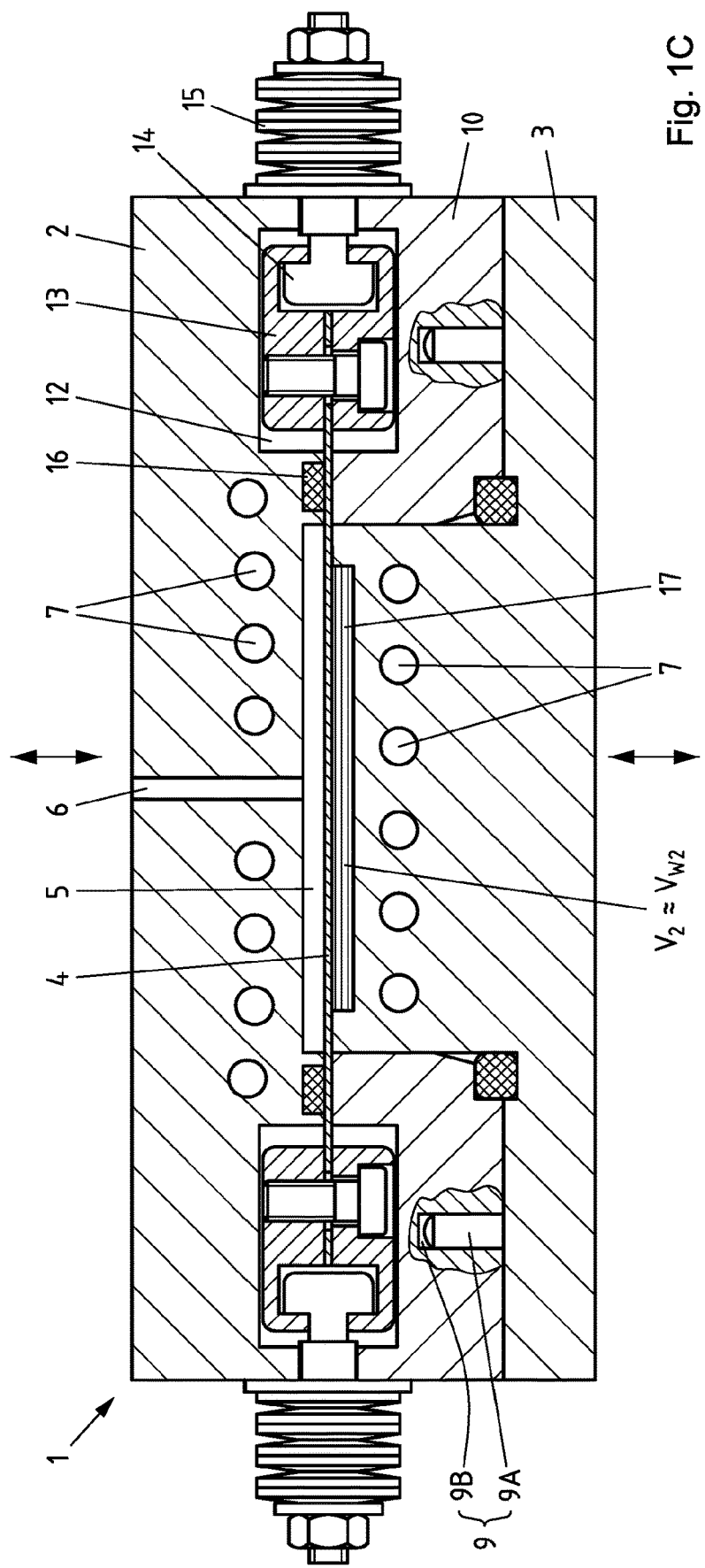
FIG. 1C: the press from FIG. 1A in closed position.

FIG. 1C shows the press 1 from FIG. 1A in closed position. The areas of the press 1 that have already been described are also provided in FIG. 1C with corresponding reference numerals. The press 1 has been closed by moving the two pressing tools 2, 3 towards one another. In the position shown in FIG. 1C, pressure and temperature are applied to the workpiece 17. Pressurisation is carried out by guiding a working medium, for example oil, through the channel 6 into the cavity 5, whereby the membrane 4 is pressed in the direction of the workpiece 17. The application of temperature can take place in different ways: One possibility is to heat the working medium guided into the cavity 5 through the channel 6 such that the heat is transferred from the working medium in the cavity 5 through the membrane 4 to the workpiece 17. Conversely, the working medium could be cooled in order to cool the workpiece 17. Alternatively or additionally to this, it can be provided that the bores 7 are flowed through by a heating and/or cooling medium, whereby first the two pressing tools 2, 3 and subsequently also the workpiece 17 can be heated or cooled. As a result of the pressure action, the working space 8 in the position shown in FIG. 1C is further reduced and has a second volume $V_2$. This results in further compression of the workpiece 17, which in the position shown in FIG. 1C, has a second workpiece volume Vw2 corresponding approximately to the second volume $V_2$ of the working space 8.

Figure 2A:
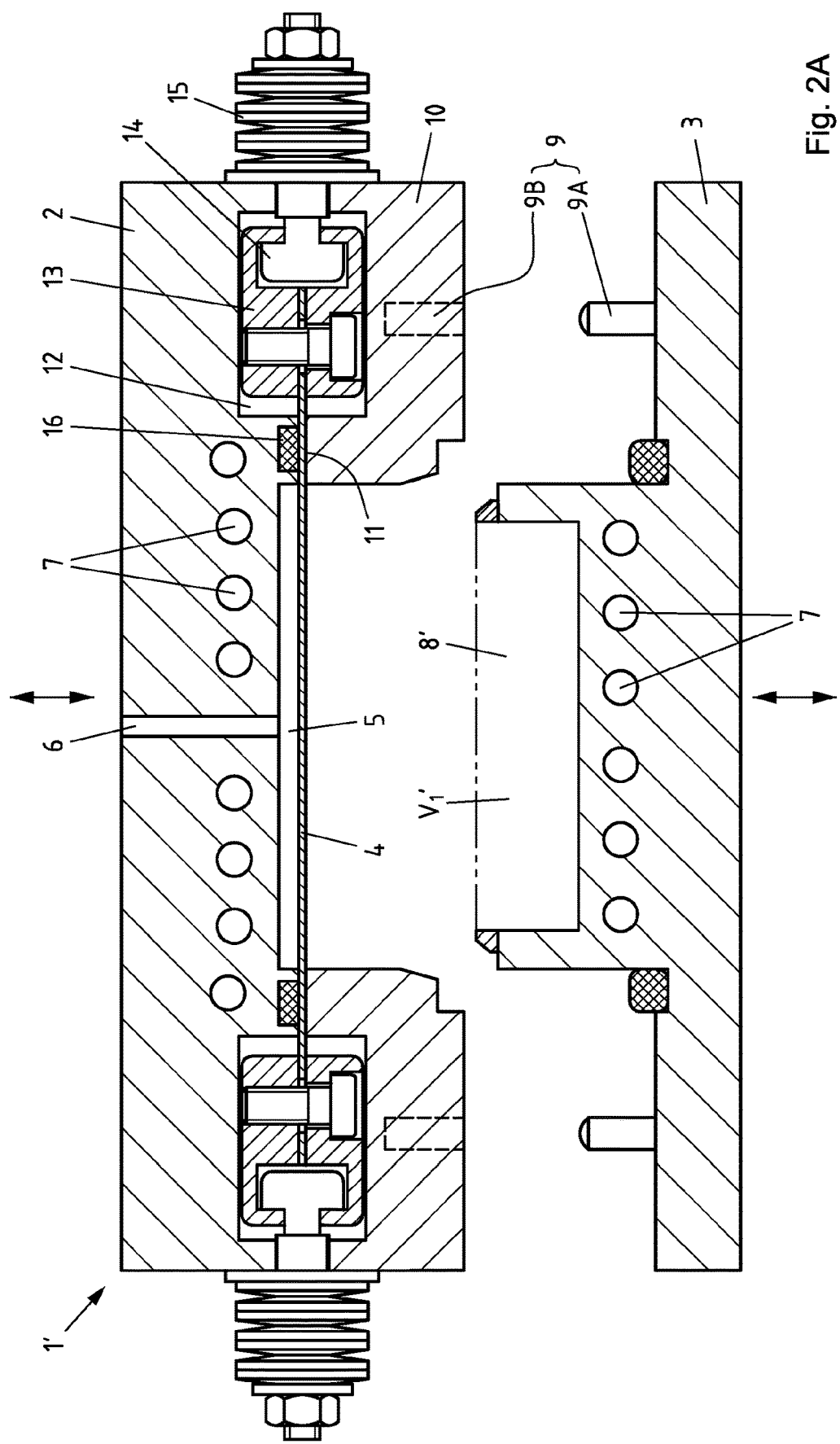
FIG. 2A: a second configuration of a press for carrying out a method according to the invention in cross-section in the open position without inserted workpieces and without inserted cores.

FIG. 2A shows a second configuration of a press 1' for carrying out a method according to the invention in cross-section in the open position without inserted workpieces 17 and without inserted cores. The areas of the press 1' that have already been described are also provided in FIG. 2A with corresponding reference numerals. The second configuration of the press 1' shown in FIG. 2A differs from the first configuration of the press 1' shown above, in particular by an enlarged working space 8', which enables the use of cores (not represented in FIG. 2A). The enlarged working space 8' has a first volume $V_1'$ when the press is open.

Figure 2B:
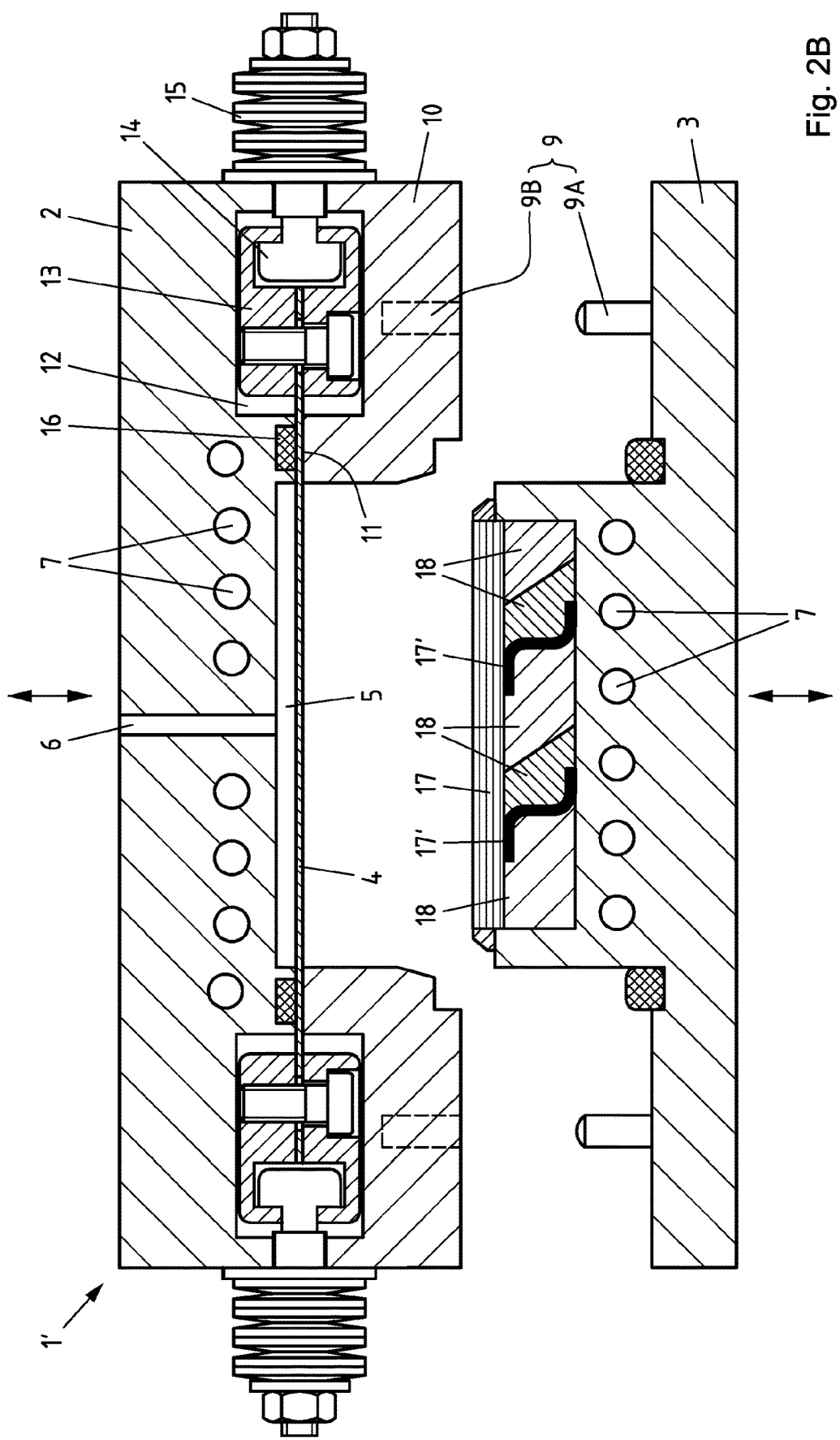
FIG. 2B: the press from FIG. 2A in open position with inserted workpieces and inserted cores.

FIG. 2B shows the press 1' from FIG. 2A in open position with inserted workpieces 17 and inserted cores 18. The areas of the press 1' that have already been described are also provided in FIG. 2B with corresponding reference numerals. In addition to the workpiece 17 already described in FIG. 1A to FIG. 1C, two further workpieces 17' are now inserted into the working space 8' of the press 1', wherein the workpieces 17' can for example be already prefabricated reinforcement elements with Z-shaped cross-section (e.g. "stringers" of an aircraft fuselage). The workpieces 17' should be connected to the workpiece 17 in the subsequent production step. In order to enable a uniform pressure distribution despite the complex geometry of the workpieces 17', a plurality of cores 18 are inserted into the working space, the shape of which is adapted to the shape of the working space 8' and to the shape of the workpieces 17, 17'. The workpieces 17, 17' together have a first workpiece volume $V_{w1}'$ and the cores 18 together have a first core volume $V_{k1}'$. The sum of the first workpiece volume $V_{w1}'$ and the first core volume $V_{k1}'$ ($V_{w1}'+V_{k1}'$) is slightly greater than the first volume $V_1'$ of the working space 8'. As a result, the workpieces 17, 17' and the cores 18 must be slightly compressed in order to be inserted into the working space 8', whereby the workpieces 17, 17' and the cores 18 are exposed to a prestressing.

Figure 2C:
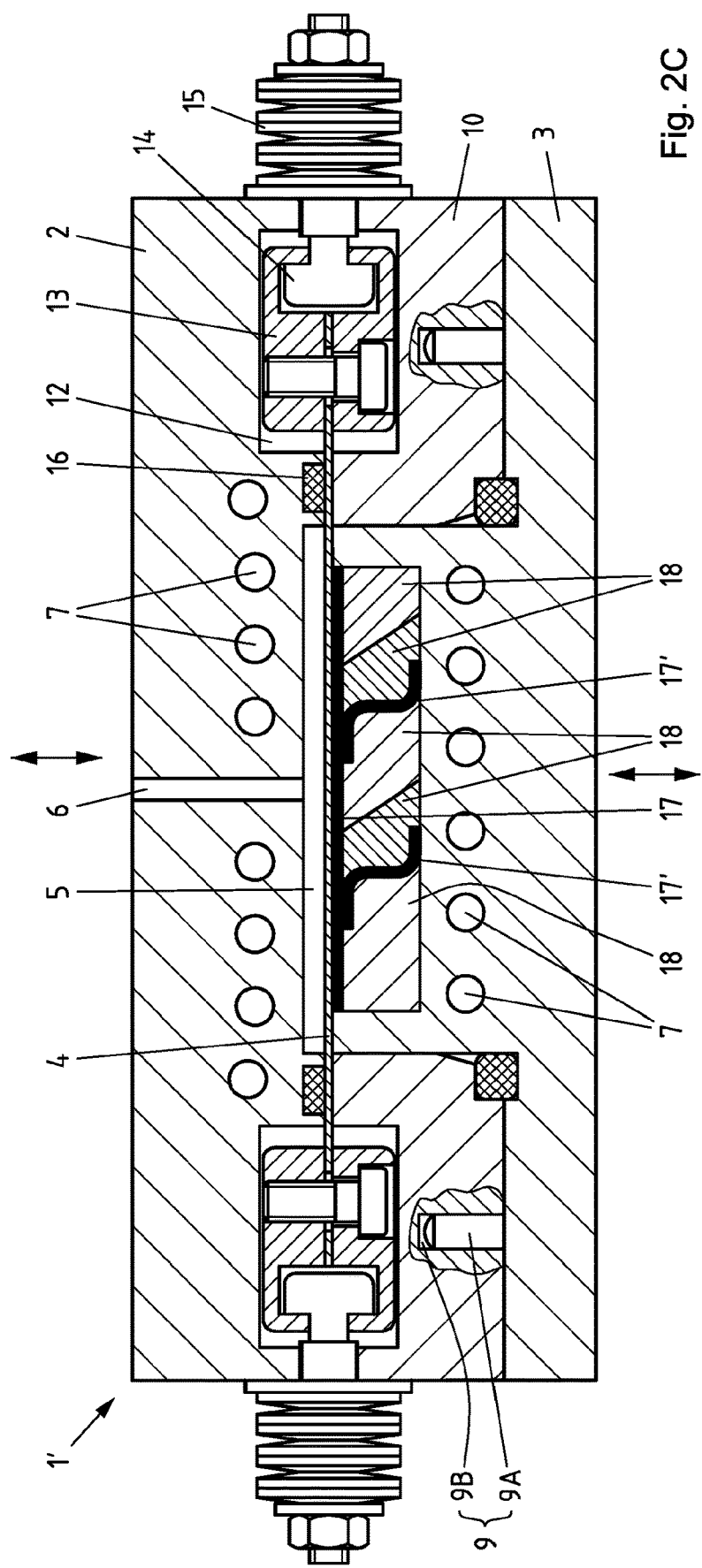
FIG. 2C: the press from FIG. 2A in closed position.

FIG. 2C shows the press 1' from FIG. 2A in closed position. The areas of the press 1' that have already been described are also provided in FIG. 2C with corresponding reference numerals. The press 1' has been closed by moving the two pressing tools 2, 3 towards one another. In the position shown in FIG. 2C, the pressure and temperature are applied to the workpieces 17, 17'. Pressurisation is carried out by guiding a working medium, for example oil, through the channel 6 into the cavity 5, whereby the membrane 4 is pressed in the direction of the workpieces 17, 17'. The application of temperature can take place in different ways: One possibility is to heat the working medium guided into the cavity 5 through the channel 6 such that the heat is transferred from the working medium in the cavity 5 through the membrane 4 to the workpieces 17, 17'. Conversely, the working medium could be cooled to cool the workpieces 17, 17'. Alternatively or additionally to this, it can be provided that the bores 7 are flowed through by a heating and/or cooling medium, whereby first the two pressing tools 2, 3 and subsequently also the workpieces 17, 17' can be heated or cooled. As a result of the pressure action, the working space 8' in the position shown in FIG. 2C is further reduced and has a second volume $V_2'$. This results in further compression of the workpieces 17, 17' and also of the cores 18. In the position shown in FIG. 2C, the workpieces 17, 17' together have a second workpiece volume $V_{w2}'$ and the cores 18 together have a second core volume $V_{k2}'$. The sum of the second workpiece volume $V_{w2}'$ and the second core volume $V_{k2}'$ ($V_{w2}'+V_{k2}'$) corresponds roughly to the second volume $V_2'$ of the working space 8'.

Figure 3:
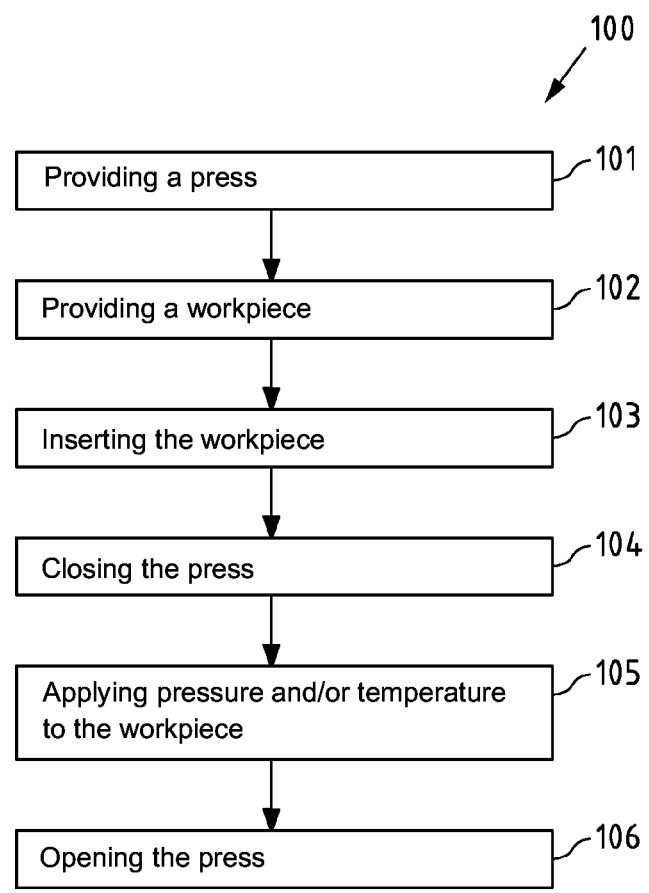
FIG. 3: the sequence of a method according to the invention in a schematic representation.

FIG. 3 finally shows the sequence of a method 100 according to the invention in a schematic representation. The method 100 comprises the following steps: 101 Providing a press, 102: Providing a workpiece, 103: Inserting the workpiece, 104: Closing the press, 105: Applying pressure and/or temperature to the workpiece, 106: Opening the press.

LIST OF REFERENCE NUMERALS

1, 1': Press
2: First (upper) pressing tool
3: Second (lower) pressing tool
4: Membrane
5: Cavity
6: Channel
7: Bore
8, 8': Working space
9: Guide
9A: Protrusion
9B: Recess
10: Edge element
11: Gap
12: Hollow space
13: Clamping device
14: Tension anchor
15: Spring
16: Seal
17, 17': Workpiece
18: Core
$V_1$, $V_1'$: First volume (of the working space 8, 8')
$V_2$, $V_2'$: Second volume (of the working space 8, 8')
$V_{w1}$, $V_{w1}'$: First workpiece volume (of the workpieces 17, 17')
$V_{w2}$, $V_{w2}'$: Second workpiece volume (of the workpieces 17, 17')
$V_{k1}$: First core volume (of the cores 18)
$V_{k2}$: Second core volume (of the cores 18)

The invention claimed is:

1. A method for manufacturing moulded parts from fibre composite material, comprising the following steps:
   a) providing a press having
      a first pressing tool,
      a second pressing tool, and
      a membrane,
      wherein the first pressing tool and the second pressing tool can be moved relative to one another,
      wherein the membrane is connected to one of the pressing tools,
      wherein a cavity is formed between the membrane and the pressing tool connected to it for a working medium,
      wherein a working space is formed in the pressing tool not connected to the membrane for a workpiece, and
      wherein, when the press is closed, the volume of the working space can be changed by moving the membrane,
   b) providing at least one workpiece with a workpiece volume, wherein the workpiece has a matrix and fibres inserted therein,
   c) inserting the workpiece into the working space of the press,
   d) closing the press, wherein the working space is equal to a first volume,
   e) applying pressure and/or temperature to the workpiece by means of the membrane, wherein the working space occupies a second volume which is smaller than the first volume, and wherein a hardened moulded part is formed form the workpiece, and
   f) opening the press and removing the moulded part,
   wherein the first volume of the working space is smaller than the workpiece volume before closing the press, so that the workpiece is already compressed in step d) and before step e).

2. The method according to claim 1,
   wherein step b), at least one core with a core volume is also provided, in that in step c), the core is also inserted into the working space of the press and in that the first volume of the working space is smaller than the sum of the workpiece volume and the core volume, so that the workpiece is already compressed in step d) and before step e).

3. The method according to claim 2,
   wherein the second volume of the working space is smaller than the sum of the workpiece volume and the core volume, so that the workpiece is also compressed during step e).

4. The method according to claim 1,
   wherein the membrane is manufactured from metal and has a thickness in the range between 0.05 mm and 0.5 mm.

5. The method according to claim 1,
   wherein during step e) the pressure and/or the temperature of the working medium in the cavity are changed.

6. The method according to claim 1,
   wherein step e), the pressure of the working medium in the cavity is increased to a maximum pressure in the range between 10 bar and 50 bar.

7. The method according to claim 1,
   wherein step e), the temperature of the working medium in the cavity is increased to a maximum temperature in the range between 300° C. and 500° C.

8. The method according to claim 1,
   wherein step b), a plurality of separate workpieces are provided, which are placed in step c) into the working space of the press and are connected to one another in step e), wherein a continuous hardened moulded part is formed from the workpieces.

9. The method according to claim 4,
   wherein the membrane is manufactured from metal and has a thickness in the range between 0.25 mm and 0.4 mm.

10. The method according to claim 6,
    wherein step e), the pressure of the working medium in the cavity is increased to a maximum pressure in the range between 15 bar and 30 bar.

11. The method according to claim 7,
    wherein step e), the temperature of the working medium in the cavity is increased to a maximum temperature in the range between 330° C. and 410° C.

* * * * *

UNITED STATES PATENT AND TRADEMARK OFFICE
CERTIFICATE OF CORRECTION

| | | |
|---|---|---|
| PATENT NO. | : 12,415,324 B2 | Page 1 of 1 |
| APPLICATION NO. | : 17/636956 | |
| DATED | : September 16, 2025 | |
| INVENTOR(S) | : Fabian Köffers | |

It is certified that error appears in the above-identified patent and that said Letters Patent is hereby corrected as shown below:

In the Claims

Column 9, Line 32, Claim 1, delete "form" and insert -- from --

Signed and Sealed this
Eighteenth Day of November, 2025

John A. Squires
*Director of the United States Patent and Trademark Office*